(12) United States Patent
Persson

(10) Patent No.: US 10,384,313 B2
(45) Date of Patent: *Aug. 20, 2019

(54) IRON-CHROMIUM BASED BRAZING FILLER METAL

(75) Inventor: Ulrika Persson, Viken (SE)

(73) Assignee: HÖGANÄS AB (PUBL), Höganäs (SE)

(*) Notice: Subject to any disclaimer, the term of this patent is extended or adjusted under 35 U.S.C. 154(b) by 796 days.

This patent is subject to a terminal disclaimer.

(21) Appl. No.: 13/395,587

(22) PCT Filed: Sep. 17, 2010

(86) PCT No.: PCT/EP2010/063689
§ 371 (c)(1),
(2), (4) Date: Mar. 29, 2012

(87) PCT Pub. No.: WO2011/033056
PCT Pub. Date: Mar. 24, 2011

(65) Prior Publication Data
US 2012/0183807 A1 Jul. 19, 2012

Related U.S. Application Data

(60) Provisional application No. 61/243,733, filed on Sep. 18, 2009.

(30) Foreign Application Priority Data

Sep. 18, 2009 (DK) .................... 2009 70116

(51) Int. Cl.
B23K 35/02 (2006.01)
B22F 1/00 (2006.01)
(Continued)

(52) U.S. Cl.
CPC ........ B23K 35/0244 (2013.01); B22F 1/0003 (2013.01); B23K 35/025 (2013.01);
(Continued)

(58) Field of Classification Search
CPC . B23K 35/24; B23K 35/3053; B23K 35/3086
(Continued)

(56) References Cited

U.S. PATENT DOCUMENTS 2,762,706 A * 9/1956 Cape ............................ 420/442
4,444,587 A 4/1984 Kelly
(Continued)

FOREIGN PATENT DOCUMENTS

EP 1 875 984 A2 1/2008
JP 02015875 A * 1/1990 ............... B23K 1/19
(Continued)

OTHER PUBLICATIONS

International Search Report (PCT/ISA/210) dated Oct. 13, 2010, by European Patent Office as the International Searching Authority for International Application No. PCT/EP2010/063689.
(Continued)

Primary Examiner — Kaj K Olsen
Assistant Examiner — Stanley S Silverman
(74) Attorney, Agent, or Firm — Buchanan Ingersoll & Rooney P.C.

(57) ABSTRACT

A brazing filler metal with excellent wetting behavior on stainless steel base material is provided. The brazing filler metal produces a brazed joint with high strength and good corrosion resistance. The brazing filler metal is suitable for brazing stainless steel and other materials where corrosion resistance and high strength is required. Typical examples of applications are heat exchangers and catalytic converters.
The iron-chromium based brazing filler metal powder comprises:
11-35 wt % chromium,
0-30 wt % nickel,
2-20 wt % copper,
2-10 wt % silicon,
(Continued)

Figure 1:
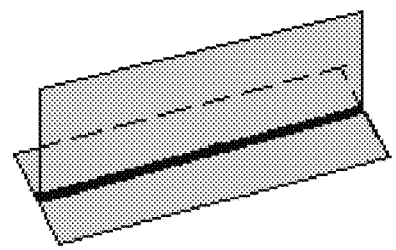

4-10 wt % phosphorous,
0-10 wt % manganese,
and at least 20 wt % iron, and
if Si is equal to or less than 6 wt % then P should be above 8 wt %, and
if P is less or equal to 8 wt % then Si should be above 6 wt %.

15 Claims, 1 Drawing Sheet

(51) Int. Cl.
| | | |
|---|---|---|
| *B23K 35/30* | (2006.01) | |
| *C22C 33/02* | (2006.01) | |
| *C22C 38/20* | (2006.01) | |
| *C22C 38/34* | (2006.01) | |
| *C22C 38/38* | (2006.01) | |
| *C22C 38/42* | (2006.01) | |
| *C22C 38/58* | (2006.01) | |

(52) U.S. Cl.
CPC ...... *B23K 35/3086* (2013.01); *C22C 33/0285* (2013.01); *C22C 38/20* (2013.01); *C22C 38/34* (2013.01); *C22C 38/38* (2013.01); *C22C 38/42* (2013.01); *C22C 38/58* (2013.01); *Y10T 428/12* (2015.01); *Y10T 428/12951* (2015.01)

(58) Field of Classification Search
USPC ................ 228/101; 420/42, 582; 428/615
See application file for complete search history.

(56) References Cited

U.S. PATENT DOCUMENTS

| | | |
|---|---|---|
| 6,203,754 B1 | 3/2001 | Sugiyama |
| 6,696,017 B2 | 2/2004 | Nagai et al. |
| 2004/0056074 A1 | 3/2004 | Sjodin |
| 2004/0184945 A1 | 9/2004 | Sjodin |
| 2008/0006676 A1 | 1/2008 | Rangaswamy et al. |
| 2009/0305078 A1 | 12/2009 | Sjodin |

FOREIGN PATENT DOCUMENTS

| | | |
|---|---|---|
| WO | WO 02/38327 A1 | 5/2002 |
| WO | WO 02/098600 A1 | 12/2002 |
| WO | WO 2008/060225 A1 | 5/2008 |
| WO | WO 2009/116931 A1 | 9/2009 |

OTHER PUBLICATIONS

Written Opinion (PCT/ISA/237) dated Oct. 13, 2010, by European Patent Office as the International Searching Authority for International Application No. PCT/EP2010/063689.

International Preliminary Report on Patentability (PCT/IPEA/409) dated Jun. 14, 2011, by European Patent Office as the International Searching Authority for International Application No. PCT/EP2010/063689.

* cited by examiner

A= joint overlap
W= width
T= thickness
D= joint clearance
L= length

IRON-CHROMIUM BASED BRAZING FILLER METAL

FIELD OF INVENTION

This invention relates to an iron-chromium based brazing filler metal suitable for brazing stainless steel and other materials where corrosion resistance and high strength is required. Typical examples of applications are heat exchangers and catalytic converters.

BACKGROUND OF THE INVENTION

Brazing is a process for joining metal parts with the help of brazing filler metal and heating. The melting temperature of the brazing filler metal must be below the melting temperature of the base material but above 450° C. If the brazing filler metal has a braze temperature below 450° C. the joining process is called soldering. The most commonly used brazing filler metals for brazing stainless steels are based on copper or nickel. Copper based brazing filler metals are preferred when considering cost advantages while nickel based brazing filler metals are needed in high corrosion and high strength applications. Copper based brazing filler metals are for example often used for brazing of heat exchangers for district heating and for tap water installations.

Nickel based brazing filler metals with high chromium content are used for their high corrosion resistance in applications exposed to corrosive environments. Nickel based brazing filler metals may also be used in high service temperature applications and/or when high strength is required in the application. A typical application exposed to both corrosive environment and high service temperature is the exhaust gas recirculation (EGR) cooler in automotive diesel engines. Brazing filler metals for these applications must have certain properties to be suitable to use such as; corrosion resistance, resistance to high temperature oxidation, good wetting of the base material, without causing embrittlement of the base material during brazing.

RELATED ART

There are several different types of nickel based brazing filler metals listed in the American Welding Society (ANSI/AWS A 5.8) standard. Many of these nickel based brazing filler metals are used for brazing heat exchangers. BNi-2 with the composition Ni-7Cr-3B-4,5Si-3Fe is used for producing high strength joints in high temperature applications. The presence of boron is, however, a disadvantage since it may cause embrittlement of the base material when boron is diffused into the base material. Other nickel based brazing filler metal containing boron has the same disadvantage.

To overcome the disadvantage of boron other nickel based brazing filler metals were developed. BNi-5 (Ni-19Cr-10Si) has high corrosion resistance due to the high chromium content. The brazing temperature for this alloy is rather high (1150-1200° C.). Other boron free nickel based brazing filler metals are BNi-6 (Ni-10P) and BNi7 (Ni-14Cr-10P). The brazing temperature for these brazing filler metals are lower due to the high content of phosphorous; 10 wt %. The high phosphorous content (10 wt %) may form a brazed joint without the required strength due to the risk to form phosphorous containing brittle phases.

Another nickel based brazing filler metal is described in U.S. Pat. Nos. 6,696,017 and 6,203,754. This brazing filler metal has the composition Ni-29Cr-6P-4Si and combines high strength and high corrosion resistance with a fairly low braze temperature (1050-1100° C.). This brazing filler metal was specially developed for the new generation of EGR coolers used in high corrosive environment.

The disadvantage with all nickel based brazing filler metals is the high content of expensive nickel. The nickel content is at least 60%, but normally higher. The high nickel content in these brazing filler metals makes the brazing filler metals and the production of heat exchangers and catalytic converters costly.

To overcome the disadvantage with the costly nickel based brazing filler metals the possibility to use iron based brazing filler metals has been studied. There are two existing iron based brazing filler metals on the market. AlfaNova, described in PCT-application WO02098600, has a composition close to stainless steel with addition of silicon, phosphorous and boron to reduce the melting point of the brazing filler metal. The braze temperature for this alloy is 1190° C.

Another iron based brazing filler metal, AMDRY805, described in US20080006676 A1 has the composition Fe-29Cr-18Ni-7Si-6P. This alloy is boron free to overcome the disadvantage with boron. The braze temperature for this alloy is 1176° C.

A third iron based brazing filler metal, Fe24Cr20Ni10Cu7P5Si5Mn, is commercially available as BrazeLet™ F300 from Höganäs AB Sweden. This alloy contains copper to prevent phosphorous precipitation and increase the corrosion resistance. The braze temperature for this alloy is 1100° C.

The highest practical temperature consistent with limited grain growth is 1095° C., according to ASM specialty hand book Stainless Steel, 1994, page 291. Therefore a low brazing temperature is preferred to avoid the problems associated with grain growth, such as less ductility and higher hardness, in the base material.

SUMMARY OF THE INVENTION

This invention relates to an iron brazing filler metal which produces a brazed joint with high strength and good corrosion resistance.

The brazing filler metal may be provided in powder form and formation into powder of the brazing filler metal may be accomplished using methods known in the art. For example, powders having the composition defined in the claims can be made by melting a homogeneous alloy and converting them to a powder by an atomization process. The mean particle size of the powder can range between 10-150 μm, normally between 10-100 μm.

The brazing filler metal powder according to the invention is an alloy containing between 11 wt % and 35 wt % chromium, between 2 wt % and 20 wt % copper, between 0 wt % and 30 wt % nickel and between 2 wt % and 10 wt % silicon, between 4 wt % and 10 wt % phosphorous and at least 20 wt % of iron. If Si is equal to or less than 6 wt % then P should be above 8 wt %. If P is less or equal to 8 wt % then Si should be above 6 wt %.

According to one embodiment, Si should be above 6 wt % and up to 10 wt % and P between 6 wt % and 10 wt %. According to another embodiment, Si should be above 6 and up to 10 wt % and P between 8 wt % and 10 wt %. The brazing filler metal may also contain manganese up to 10 wt %. The brazing filler metal is suitable for production of catalytic converters and heat exchangers.

DETAILED DESCRIPTION OF THE INVENTION

This invention relates to an iron-chromium based brazing filler metal with excellent wetting on stainless steel. The brazing filler metal produces high strength brazed joints with good corrosion resistance and is significantly lower in cost compared to nickel based brazing filler metals. This brazing filler metal is suitable for brazing different types of heat exchangers and catalytic converters at a significantly lower cost than conventional nickel based brazing filler metals.

The typical use for this brazing filler metal is in high temperature applications operating in corrosive environments. These applications can be different types of heat exchangers (plate or pipe) that are used in automotive applications, for example exhaust gas recirculation. Other examples are catalytic converters of different types.

The composition of the brazing filler metal according to this invention is

Iron at a content of at least 20 wt %
Copper about 2-20 wt %, preferably 5-15 wt %
Chromium about 11-35 wt %, preferably 20-30 wt %
Nickel about 0-30 wt %, preferably 10-20 wt %
Silicon about 2-10 wt %
Phosphorous about 4-10 wt %
and if Si is equal or less than 6 wt % then P should be above 8 wt %
and if P is less or equal to 8 wt % then Si should be above 6 wt %.

This means that either the content of Si is above 6 wt % or the content of P is above 8 wt % or both i.e. the content of Si is above 6 wt % and the content of P is above 8 wt %.

According to one embodiment Si should be above 6 wt % and up to 10 wt % and P between 6 wt % and 10 wt %. According to a second embodiment Si should be above 6 and up to 10 wt % and P between 8 wt % and 10 wt %.

Other components than those listed can be present.

The brazing filler metal may optionally contain manganese up to 10 wt %, normally less than 7 wt %.

It is recognized that it can be advantageous for the composition of the main components of the brazing filler material to be similar to the composition of the stainless steel base material. Examples of stainless steel grades are 316L having a typical composition of Fe-17 Cr-13,5 Ni-2,2 Mo and 304L, having a typical composition of Fe-18,8 Cr-11,2 Ni. All stainless steel contain by definition a minimum of 11% chromium and few stainless steels contains more then 30% chromium. Chromium content above 11% is required for the formation of the protective chromium oxide layer which gives the steel its corrosion resistant characteristics. The higher chromium content the better corrosion resistance but contents above 35% may cause decrease in the joint strength. Thus the chromium content should be between 11 and 35 wt %, preferably 20-30 wt %.

To reduce the melting point of the alloy, melting point depressants are added. It is well known that silicon, boron and phosphorous each are effective melting point depressants. Studying the phase diagram for Fe—P it is found that the system has a melting point minimum of 1100° C. at approx 10 wt % phosphorous. The Fe—Si system has a melting point of 1380° C. at 10 wt % Si and a melting point minimum of approx. 1210° C. at approx. 19 wt % Si. Contents of phosphorous and silicon above 10 wt % each is not desirable since the risk for brittle phase formation is too high. In U.S. Pat. Nos. 6,696,017 and 6,203,754 it is mentioned that the Si+P content should be kept between 9 and 11.5 wt % In case of the alloy having a total content of Si and P higher than 11.5 wt % the alloy becomes brittle and the strength decreases.

Surprisingly it was found that copper reduces the diffusion of silicon and phosphorous into the base material during the brazing operation. The precipitation of phosphorous at the grain boundary in the base material is also prevented which means that the embrittlement of the base material is also avoided. Further, this means that a higher total amount of Si and P, in combination with Cu may be used in order to increase the strength of the brazed joint. Where high strength is required it is therefore preferred to keep the phosphorous and silicon content high. The total amount of Si and P in a Cu containing brazing material may therefore be up to 20 wt %.

Therefore when Si is equal to or less than 6 wt %, P should be above 8 wt % and if P is less or equal to 8 wt %, Si should be above 6 wt %. Also, Si+P have to be above 10 wt % and normally Si+P will be above 14 wt %.

It was also unexpectedly found that the presence of copper has a positive effect on the corrosion resistance of the brazed joints in 10% $H_2SO_4$. It is believed that 2 wt % copper is needed to gain the positive effect of copper. The copper content of the brazing filler metal covered by this invention should be kept below 20 wt % in order not to differ too much in chemistry from the base material to be brazed. Thus the copper content should be between 2 and 20 wt %, preferably 5-15 wt %.

The Fe—B system has a melting point minimum of 1174° C. at approx 4 wt % boron. However boron has the disadvantage to cause embrittlement of the brazed component. Boron is an interstitial and because of its small diameter it can quickly diffuse into the lattice of the base material and form the brittle CrB phase. Due to the diffusion of boron the re-melting temperature of the alloy is increased which in some cases is a desirable effect. U.S. Pat. No. 4,444,587 describes how manganese can be a good substitute for boron since manganese also depresses the melting point. 10-30 wt % manganese together with silicon and carbon will in the iron-based system lower the melting temperature with over 200° C. Secondly, manganese will almost completely vaporize during the brazing cycle which will allow rising of the re-melting temperature but without the risk of forming any brittle phases like CrB.

Nickel stabilises austenite which enhances the oxidation resistance of the alloy. Nickel also increases the toughness of the brazed joint. Looking at the tertiary phase diagram for Cr—Fe—Ni it can be seen that nickel also has a melting point depressing effect. With 30 wt % Cr and 20 wt % Ni the melting point of the Cr—Fe—Ni system is approx 1470° C. according to ASM specialty hand book Stainless Steel. The nickel content of the brazing filler metal related to this invention should be kept below 30 wt % to minimize the cost of the brazing filler metal.

The brazing filler metal according to this invention is in the form of powder and can be produced by either gas or water atomization. The brazing filler metal can be used in the form of powder or converted to a paste, tape, foil or other forms by conventional methods. Depending on the application technique different particle size distribution is needed but the mean particle size of the brazing filler metal powder is 10-100 μm.

The brazing filler metal is suitable for vacuum furnace brazing using vacuum (<$10^{-3}$ Torr). The brazing filler metal has a melting point below 1100° C. and produce joints at a brazing temperature of 1120° C. having high strength and good corrosion resistance without any observed grain growth.

The brazing filler metal in the form of paste, tape, foil or other forms is placed at the gap or in the gap between the surfaces of the base material which are to be joined. During heating the brazing filler metal melts and by capillary forces the melted brazing filler metal wets the surface of the base material and flows into the gap. During cooling it forms a solid brazed joint. Because the brazing filler metal is acting on capillary forces the wetting of the brazing filler metal on the base material to be brazed is crucial. The brazing filler metal covered by this invention has excellent wetting on stainless steel base material. The brazing filler metal also has good gap width tolerance and is able to braze gaps above 500 μm.

The joints brazed with the brazing filler metal according to this invention have a microstructure consisting of a homogenous mix of Cr—P rich phases and Ni—Fe—Si—Cu rich phases. Surprisingly it was found that the diffusion of silicon and phosphorous was limited by the presence of copper in the brazing filler metal. The precipitation of phosphorus at the grain boundaries in the base material was also prevented by the presence of Cu. The brazing filler metals without copper had a wider diffusion zone in the base material and there was also precipitation of phosphorous at the grain boundaries which may cause embrittlement of the base material.

EXAMPLES

As reference materials two iron brazing filler metals were used; Fe24Cr20Ni10Cu7P5Si5Mn (called Ref 1) and Fe29Cr18Ni7Si6P (called Ref 2).

Ref 1 is an iron based brazing filler metal, BrazeLet™ F300, produced by Höganäs AB.

Ref 2 is an iron based brazing filler metal described in patent application US2008006676.

Further, three different brazing filler metals according to the invention were prepared by water atomization.

Table 1 shows the actual composition of the produced brazing filler metals. The amount of each component is given in weight percent. The expression 'bal' (balance) means that the remaining material in the melt consists of Fe. According to the invention, the filler metal powder comprises at least 20 wt % Fe, and the remaining components are adjusted within the indicated limits in order to add up to 100 wt %. Trace elements are results of inevitable impurities caused by the method of production and trace elements are present in such a small amount that they do not influence the properties of the brazing filler material. Trace elements are normally present in a total amount smaller than 1 wt %.

A first criteria to be satisfied for the brazing filler material is that the braze temperature should preferably be 1100° C. or lower. It can be seen in table 1 that the temperature at which the brazing filler metal melts and brazes is affected by copper. Ref 2 does not melt at 1100° C.

The methods used for testing the properties are as follows:
1) Wetting Test.

The brazing filler metal (0.2 grams) was placed in the shape of a circle having a diameter of 9 mm at the centre of a stainless steel substrate. The area covered by the powder, the initial powder area ($A_i$) was 63.6 mm². The substrates with the brazing filler metal were then heated at 1100° C. for 30 min in vacuum of $10^{-4}$ Torr. The wetting was determined in terms of spreading ration defined as: $S=A_m/A_i$ where $A_m$ is the area of the melted filler metal and $A_i$ is the initial powder area.

From table 2 it can be seen that the brazing filler metals with high copper (Ref 1) has very good wetting. The brazing filler metal covered by this invention (Alloy 1, 2 and 3) have moderate wetting.

2) Metallographic Examination

The brazing filler metal was converted to a paste by mixing the metal powder with a binder. 304 stainless steel was used as base material. T-specimens, according to FIG. 1 were brazed at 1100° C. for 30 min in vacuum of $10^{-4}$ Torr. After brazing the T-specimens were cross-sectioned. The cross section area of the brazed joint was investigated in Light Optical Microscope. A good brazed joint is identified as a pore and crack free joint with a homogenous microstructure.

As seen in table 2 the brazing filler metal alloy according to this invention (Alloy 1, 2 and 3) forms a homogenous microstructure with limited diffusion of elements into the base material and no precipitation of phosphorous at the grain boundaries. Significantly more diffusion into the base material was found when using iron based brazing filler metal without copper (Ref 2)

3) Joint Strength.

Figure 2:
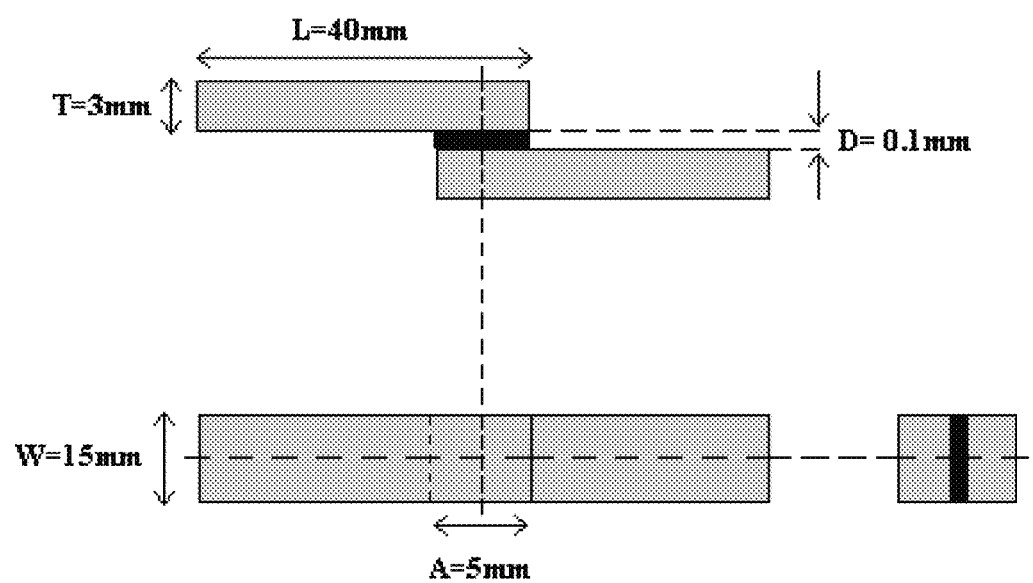

Joint strength was tested using procedures similar to those recommended in ANSI/AWS C3.2M/C3.2.2001 for the lap type joint configuration with 100 μm parallel clearance (see FIG. 2). Before brazing the brazing filler metal was converted to a paste by mixing the brazing filler metal with a binder. The joint strength specimens with the applied paste were then heated to 1100° C. for 30 min in vacuum of $10^{-4}$ Torr.

From table 2 it can be seen that the highest strength is obtained for the alloys with the highest Si+P content; Alloy 1, 3. Even Alloy 2 also has significantly higher strength than Ref 1 with less Si+P. This proves, quite contrary to what was believed that high silicon and phosphorous contents in combination with Cu results in high strength.

4) Corrosion Tests

The corrosion resistance was investigated by placing brazed T-specimens into beakers containing corrosion media for one week. The specimens were thereafter inspected for signs of corrosion. A total of 5 brazed specimens were produced: one for each alloy. The corrosion media used were water solutions of 10% by weight of $H_2SO_4$.

The results are found in table 2. Alloy 1-3 and Ref 2 had signs of corrosion attack but Ref 2 was most affected. Comparing Ref 2 to the other iron based alloys proves the positive effect of Cu on the corrosion resistance in an iron-chromium based brazing material. Comparing the alloys covered by this invention (Alloy 1, 2 and 3) and Ref 1 it shows the benefits of higher chromium content when it comes to corrosion resistance.

TABLE 1

Chemistry and melting temperature of the tested brazing filler metals.

| Alloy | | Fe | Cu | Cr | P | Si | Ni | Mn | Si + P | Melting at 1100° C. |
|---|---|---|---|---|---|---|---|---|---|---|
| 1 | Inv | Bal | 5.3 | 15.3 | 7.4 | 9.4 | 11 | 0 | 16.8 | Yes |
| 2 | Inv | Bal | 5.1 | 15.2 | 9.2 | 4.9 | 10.1 | 0 | 14.1 | Yes |
| 3 | Inv | Bal | 5.1 | 15.1 | 8.5 | 7.1 | 9.9 | 0 | 15.6 | Yes |

TABLE 1-continued

Chemistry and melting temperature of the tested brazing filler metals.

| Alloy | | Fe | Cu | Cr | P | Si | Ni | Mn | Si + P | Melting at 1100° C. |
|---|---|---|---|---|---|---|---|---|---|---|
| Ref 1 | Ref | Bal | 10 | 24 | 7 | 5 | 10 | 5 | 12 | Yes |
| Ref 2 | Ref | Bal | 0 | 28 | 7 | 6 | 18 | 0 | 13 | No |

TABLE 2

Results from wetting test, metallographic examination, joint strength test and corrosion tests.

| Alloy | | Spreading ratio | Joint strength (N/mm²) | Corrosion on brazed joints | Diffusion of elements and precipitation of P |
|---|---|---|---|---|---|
| 1 | Inv | 15 | 105 | Some | Limited diff, no precip. |
| 2 | Inv | 20 | 88 | Some | Limited diff, some precip. |
| 3 | Inv | 23 | 110 | Some | Limited diff, no precip. |
| Ref 1 | Comp | 40 | 77 | None | No diff, no precip. |
| Ref 2 | Comp | 15 | 93 | Severe | Diffusion, no precip. |

The invention claimed is:

1. An iron-chromium based brazing filler metal powder suitable for brazing of stainless steel base material comprising:
   11-35 wt % chromium,
   0-30 wt % nickel,
   5-20 wt % copper,
   2-10 wt % silicon,
   4-10 wt % phosphorous,
   0-10 wt % manganese, and
   trace elements in amounts less than 1 wt %
   balanced with at least 20 wt % iron, and
   if silicon is equal to or less than 6 wt % then phosphorous should be above 8 wt %, and
   if phosphorous is less or equal to 8 wt % then silicon should be above 6 wt %,
wherein the iron based brazing filler metal powder has a mean particle size of 10-100 μm.

2. The brazing filler metal powder according to claim 1, wherein the silicon content is above 6 wt % and below or equal to 10 wt %.

3. The brazing filler metal powder according to claim 1, wherein the phosphorous content is above 6 wt % and below or equal to 10 wt %.

4. The brazing filler metal powder according to claim 1, wherein the total amount of silicon and phosphorous is below or equal to 20 wt %.

5. The brazing filler metal powder according to claim 1, wherein the nickel content is between 10 and 20 wt %.

6. The brazing filler metal powder according to claim 1, wherein the copper content is between 5 and 15 wt %.

7. The brazing filler metal powder according to claim 1, wherein the manganese content is below 7 wt %.

8. The brazing filler metal powder according to claim 1, wherein the chromium content is between 20 and 30 wt %.

9. The brazing filler metal powder according to claim 1, wherein the chromium content is between 11 and 20 wt %.

10. The brazing filler metal powder according to claim 1, wherein the iron based brazing filler metal is converted to paste, tape, or foil by conventional methods.

11. The brazing filler metal powder according to claim 1, wherein the phosphorous content is above 8 wt % and below or equal to 10 wt %.

12. The brazing filler metal powder according to claim 1, wherein the nickel content is 0 and 20 wt %, wherein the phosphorous content is above 8 wt % and below or equal to 10 wt %.

13. An iron-chromium based brazing filler metal powder suitable for brazing of stainless steel base material comprising:
   11-35 wt % chromium,
   0-20 wt % nickel,
   5-20 wt % copper,
   2-10 wt % silicon,
   4-10 wt % phosphorous,
   0-10 wt % manganese, and
   trace elements in amounts less than 1 wt %
   balanced with at least 20 wt % iron, and
   if silicon is equal to or less than 6 wt % then phosphorous should be above 8 wt %, and
   if phosphorous is less or equal to 8 wt % then silicon should be above 6 wt %.

14. An iron-chromium based brazing filler metal powder suitable for brazing of stainless steel base material comprising:
   11-35 wt % chromium,
   0-30 wt % nickel,
   5-20 wt % copper,
   2-10 wt % silicon,
   8-10 wt % phosphorous,
   0-10 wt % manganese, and
   trace elements in amounts less than 1 wt %
   balanced with at least 20 wt % iron.

15. An iron-chromium based brazing filler metal powder suitable for brazing of stainless steel base material comprising:
   11-35 wt % chromium,
   0-30 wt % nickel,
   5-20 wt % copper,
   2-10 wt % silicon,
   4-10 wt % phosphorous,
   0-10 wt % manganese, and
   trace elements in amounts less than 1 wt %
   balanced with at least 20 wt % iron, and
   if silicon is equal to or less than 6 wt % then phosphorous should be above 8 wt %, and
   if phosphorous is less or equal to 8 wt % then silicon should be above 6 wt %,
wherein the iron based brazing filler metal is converted to paste, tape, or foil by conventional methods.

* * * * *